June 10, 1969    N. E. FARLEY, JR    3,449,714
VEHICLE SEATBELT SAFETY SYSTEM
Filed May 6, 1965

INVENTOR.
Nelson E. Farley, Jr., Deceased
Elizabeth L. Farley, Executrix
BY
Albert F. Duke
ATTORNEY

United States Patent Office 3,449,714
Patented June 10, 1969

3,449,714
VEHICLE SEATBELT SAFETY SYSTEM
Nelson E. Farley, Jr., deceased, late of Farmington, Mich., by Elizabeth L. Farley, executrix, Farmington, Mich., assignor to General Motors Corporation, Detroit, Mich., a corporation of Delaware
Filed May 6, 1965, Ser. No. 453,842
Int. Cl. B60q 1/00; G08b 5/00; B60k 27/00
U.S. Cl. 340—52
10 Claims This invention relates to motor vehicle safety systems and more particularly to a system for controlling the operation of the motor vehicle in response to the condition of the vehicle seatbelts.

It is a primary object of the present invention to aid in the safe operation of a motor vehicle by reminding the operator to fasten his seatbelt before driving.

It is another object of the present invention to provide a vehicle control system which prevents starting of the vehicle until the seatbelts have been fastened.

It is a further object of the present invention to indicate to the vehicle operator that the vehicle will not start because the seatbelts are not fastened.

It is a further object of the present invention to inform the driver if a passenger has not fastened his seatbelt.

It is another object of the present invention to provide a seatbelt controlled system wherein the vehicle operator may manually override the system at his option but which requires an overriding action by the operator each time the engine is stopped and restarted.

These and other objects and advantages of the present invention will be more clearly understood from the following detailed description which should be read in conjunction with the drawings in which.

Figure 1:
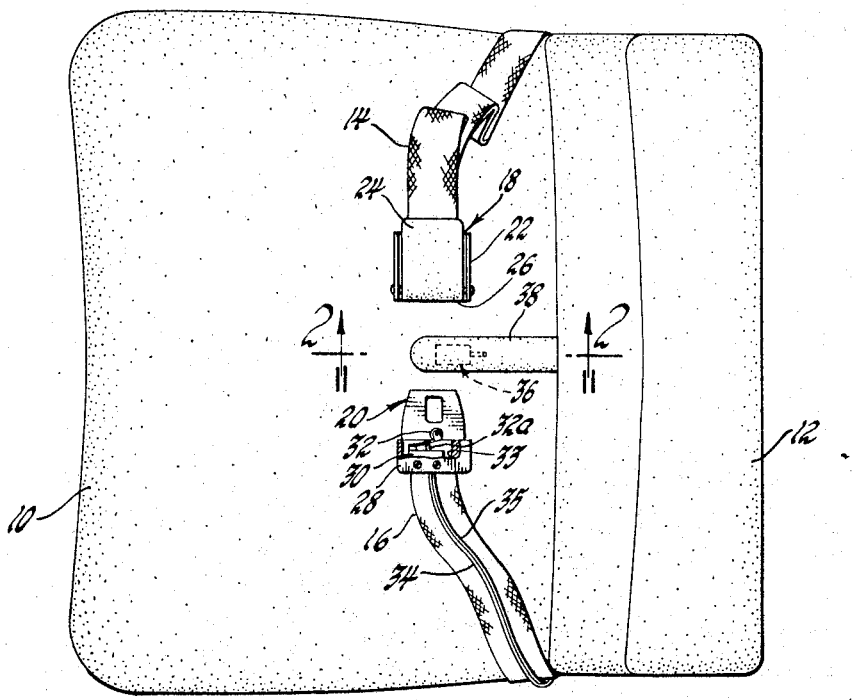
FIGURE 1 shows a vehicle seat provided with an occupancy responsive switch and a pair of seatbelt straps provided with a seatbelt switch.

Referring now to the drawings and initially to FIGURE 1, there is shown a conventional motor vehicle seat including a seat cushion 10 and a seat back 12. A pair of seatbelt straps 14 and 16 having one end secured to the vehicle floor (not shown) are provided at their opposite ends with cooperating seatbelt buckle members 18 and 20 which are adapted to be coupled about the occupant of the seat. The buckle member 18 includes a channel shaped base member 22 pivotally supporting a latching member 24 having a front end portion 26. An opening (not shown) is provided between the base member 22 and the latching member 24 for receiving the buckle member 20. A detailed description of the latching mechanism for interlocking the buckle members 18 and 20 is unnecessary for an understanding of the present invention. Reference may be had to Patent No. 2,876,516 for additional details of the buckle members 18 and 20 if such is desired.

A switch housing 28 is secured to the buckle member 20 and supports a conventional microswitch 30 which includes an operating lever 32 which extends through an opening 33 in the housing 28 and is adapted to be engaged by the front wall 26 of the release member 24. Movement of the operating lever 32 in a clockwise direction operates a plunger 32a which controls the opening and closing of the switch 30. The switch 30 is normally closed when the buckle members 18 and 20 are uncoupled. The terminals of the switch 30 are connected by insulated conductors 34 and 35 which are sewn or otherwise fastened to the strap 16.

An occupancy responsive switch generally designated 36 may be sewn or otherwise secured to the outer lining of the seat covering. A piece of fabric or leather 38 preferably of the same material as the covering for the seat 10 is suitably secured to the seat 10 to conceal the occupancy responsive switch 36.

Figure 2:
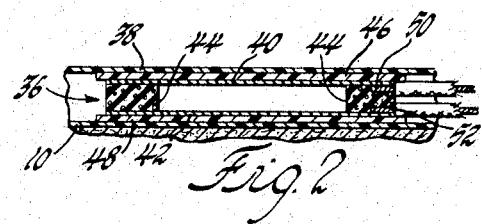
FIGURE 2 is a sectional view of the occupancy responsive switch of the present invention.

Referring to FIGURE 2, the occupancy responsive switch 36 comprises a pair of flexible metal contact plates 40 and 42 separated by suitable insulating material 44 such as sponge rubber. Two pieces of vinyl fabric 46 and 48 cover the outer surfaces of the contact plates 40 and 42 and conductors 50 and 52 make contact with the plates 40 and 42, respectively. Thus, when the seat 10 is occupied, the flexible contact plates 40 and 42 complete an electrical circuit through the conductors 50 and 52.

Figure 3:
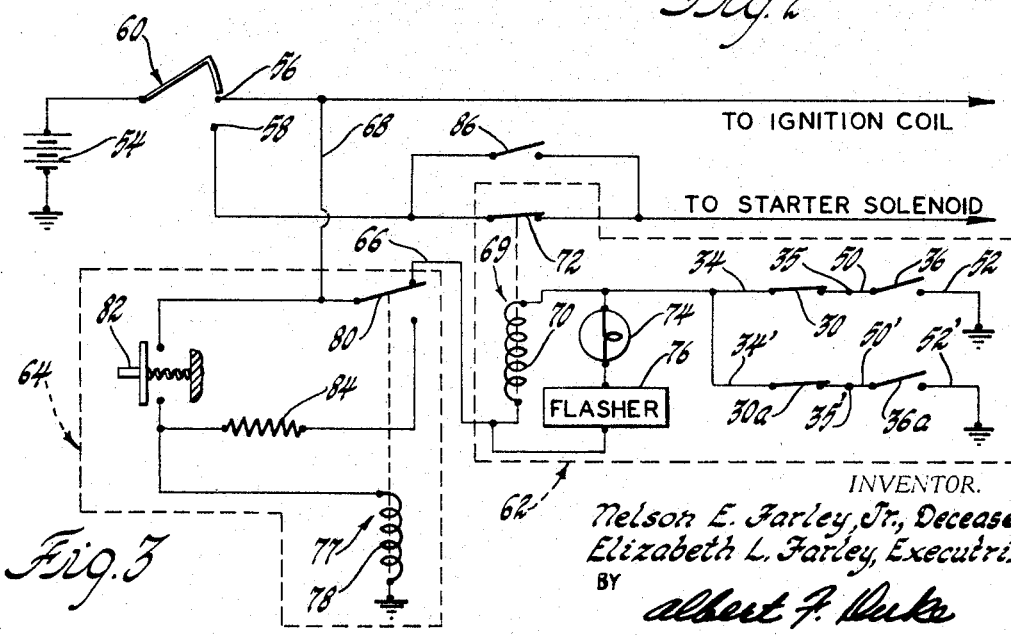
FIGURE 3 is a schematic diagram of the system.

Referring now to FIGURE 3, a portion of the electrical system of the motor vehicle is shown in order to clearly indicate the electrical connection of the safety circuit and override circuit of the present invention.

A source of voltage 54 which is preferably a vehicle battery is adapted to be connected to the vehicle ignition coil primary circuit originating at the terminal 56 and to the vehicle starter solenoid circuit originating at the terminal 58 by a conventional ignition switch 60 which is shown in the open position. As is conventional in present motor vehicles, the ignition switch 60 may be rotated clockwise to contact terminal 58 to start the engine and will return the position in contact with the terminal 56 when released to deenergize the starter solenoid.

The safety circuit of the present invention is generally designated 62 and is connected in parallel with the ignition circuit through the automatically resetting override circuit generally designated 64 and the conductors 66 and 68. The safety circuit 62 comprises a relay 69 including a relay coil 70 and a normally closed contact 72 connected between the terminal 58 and the starter solenoid. The energizing circuit for the relay coil 70 is completed through the normally closed seatbelt condition responsive switch 30 and the seat occupancy responsive switch 36. An indicating lamp 74 and a flasher 76 of conventional design are connected in series across the relay coil 70.

The switches 30a and 36a are associated with the seatbelts and seat provided for another passenger in the vehicle. Preferably, a seatbelt switch and a seat occupancy responsive switch is provided for each set of seatbelts in the vehicle. The series circuit including the switches 30a and 36a is connected in parallel with the switches 30 and 36.

The override circuit 64 comprises a relay 77 including a relay coil 78 and relay contacts 80 normally completing the circuit to the relay coil 70. A momentary contact switch 82 is connected between the relay coil 78 and the conductor 68. A holding circuit for the relay coil 78 includes a current limiting resistor 84 and bypasses the switch 82 once the relay 78 has been energized.

A manually operative bypass switch 86 is connected in parallel with the relay contact 72 in order for the driver to override the starter circuit deenergizing function of the relay 69 if such is desired.

Operation

The operation of the system is as follows. When the driver is seated in the vehicle, the occupancy responsive switch 36 closes. Assuming the bypass switch 86 is open, then when the driver moves the ignition switch to the start position engaging terminal 58, the lamp 74 and the relay coil 70 will be energized through conductor 68, relay contact 80, conductor 66 and the switches 30 and 36. Energization of the relay coil 70 opens relay contact 72 thus preventing starting of the vehicle. The driver is thus reminded to fasten his seat belt and in so doing, opens the switch 30 deenergizing the relay coil 70 thereby closing the relay contacts 72 after which the vehicle may be started. If there is a passenger in the vehicle the occupancy responsive switch 36a will be closed and thus the lamp 74 will be energized even though the driver may have already fastened his seat belt. The driver is thus appraised of the fact that the seatbelt is unfastened in the passenger's seat. It will be apparent that if no passenger is in the vehicle, the normally closed circuit from the battery 54 through the lamp 74 and the seatbelt switch 30a will be interrupted by the normally open switch 36a.

After the vehicle is started, the ignition switch 60 will automatically turn to the run position in contact with terminal 56 so that battery voltage is still applied across the lamp 74 and flasher 76 through the relay contact 80 and the switches 30 and 36 or 30a and 36a. Thus, if after starting the vehicle, a passenger should unfasten his seatbelt, the driver will be immediately apprised of this fact.

Under certain circumstances, the driver may wish to override both the warning indication given by the lamp 74 and the starter circuit deenergizing function of the relay 69. This may be accomplished by momentarily closing the switch 82 which energizes the relay coil 78 drawing the relay contact 80 downwardly and interrupting the circuit from the battery to the lamp 74 and relay coil 70. Energization of the relay coil 78 provides a holding circuit through the resistor 84 so that the relay coil 78 remains energized after release of the switch 82. It will be apparent, however, that when the vehicle is stopped and the ignition switch 60 is opened, the relay coil 78 will be deenergized thus again closing the circuit to the lamp 74 and the relay 70 so that when the operator subsequently moves the ignition switch 60 to the start position in contact with terminal 58, the vehicle will not start and the warning lamp 74 will be energized until the seatbelts are fastened.

If the operator so desires, he may bypass the relay 69 by closing switch 86 thus defeating the starter circuit deenergizing function of the relay 69. The warning circuit to the lamp 74, however, is still in effect and will apprise the operator of the fact that the seatbelts are not fastened.

What is claimed is:

1. In a motor vehicle having a battery, a starter solenoid, an ignition circuit arranged generally in parallel with said starter solenoid, and an ignition switch for selectively connecting said battery to said starter solenoid and said ignition circuit,
the improvement comprising a safety circuit connected in parallel with said ignition circuit,
said safety circuit including relay means,
relay contact means movable in response to operation of said relay means and being connected in series with said starter solenoid, said relay contact means being ineffective to control the condition of said ignition circuit,
a seatbelt condition responsive switch connected in series with said relay means for controlling the operation of said relay means.

2. In a motor vehicle including a source of power, a starting circuit, a running circuit arranged generally in parallel with said starting circuit, and an ignition switch adapted to selectively connect said source to said circuits,
the improvement comprising a safety circuit connected in parallel with said running circuit,
said safety circuit comprising, in series, relay means, a seat belt condition responsive switch and a seat occupancy responsive switch,
relay contact means, connected in said starting circuit, and movable in response to operation of said relay means to control starting of said vehicle, said relay contact means being ineffective to control the condition of said running circuit.

3. A motor vehicle safety circuit as set forth in claim 2 and further including additional relay means,
normally operable momentary switching means connecting said additional relay means in parallel with said safety circuit,
additional relay contact means connected in series with said safety circuit and being responsive to said additional relay means,
a holding circuit in parallel with said momentary switching means,
energization of said additional relay means closing said holding circuit through said additional relay contact means,
and a bypass switch connected in parallel with said relay contact means.

4. In a motor vehicle having a battery, a starter solenoid, an ignition circuit arranged generally in parallel with said starter solenoid, and an ignition switch for selectively connecting said battery to said starter solenoid and said ignition circuit,
the improvement comprising a safety circuit connected in parallel with said ignition circuit,
said safety circuit including relay means,
relay contact means movable in response to operation of said relay means and being connected in series with said starter solenoid,
said relay contact means being ineffective to control the condition of said ignition circuit,
a seatbelt condition responsive switch and circuit control means connected in series with said relay means for controlling the operation of said relay means.

5. The safety circuit as set forth in claim 4 being further defined by indicating means connected in parallel with said relay means.

6. The safety circuit as set forth in claim 4 in which said control circuit means is defined by seat occupancy responsive switching means connected in series with said seatbelt condition responsive switch.

7. The improvement as set forth in claim 4 in which said circuit control means includes an automatically resetting overriding circuit connected in parallel with said safety circuit,
said overriding circuit comprising additional relay means,
manually operable momentary switch means connected in series with said additional relay means,
additional relay contact means movable in response to operation of said additional relay means and being connected in series with said safety circuit,
a holding circuit in parallel with said momentary switch means,
energization of said additional relay means energizing said holding circuit through said additional relay contact means.

8. In a motor vehicle having a seat mounted therein and an electrical system including a battery, a starter solenoid, an ignition circuit arranged generally in parallel with said starter solenoid, and an ignition switch for selectively connecting said source to said solenoid and said ignition circuit,
the combination including a pair of seatbelt straps, one end of each of said straps being secured to said vehicle,
first and second cooperating buckle members secured respectively to the other ends of said straps,
a seatbelt switch secured to said first buckle member and including a switch operating member engageable by said second buckle member to operate said switch when said buckle members are coupled,
relay means connected in series with said seatbelt switch and in parallel with said ignition circuit,
circuit control means connected in series with said relay means,
relay contact means connected in series with said starter solenoid and responsive to the energization of said relay means whereby said starter solenoid cannot be energized until said buckle members are coupled and said circuit control means is actuated, said relay contact means being ineffective to control the condition of said ignition circuit.

9. The combination as set forth in claim 8 in which said circuit control means includes a seat occupancy responsive switch fastened to said seat,
  said switch including a pair of flexible electrically conductive plates,
  insulating means in contact with respective opposite ends of said plates,
  additional insulating means secured to the exterior surfaces of said plates,
  and conductor means connecting said plates in series with said seatbelt switch.

10. The combination as set forth in claim 9 wherein said seatbelt switch is normally closed and said seat occupancy switch is normally open.

References Cited

UNITED STATES PATENTS

| | | | |
|---|---|---|---|
| 3,166,146 | 1/1965 | Shaw | 180—82.8 |
| 3,200,370 | 8/1965 | Rush | 340—52 |
| 3,226,674 | 12/1965 | Eriksson | 340—278 |

ALVIN H. WARING, *Primary Examiner.*

U.S. Cl. X.R.

180—82; 280—150; 307—10; 340—278